United States Patent
Shenoy

(10) Patent No.: US 11,695,332 B2
(45) Date of Patent: Jul. 4, 2023

(54) VOLTAGE REGULATOR FOR SERIES-CONNECTED LOADS

(71) Applicant: Texas Instruments Incorporated, Dallas, TX (US)

(72) Inventor: Pradeep Samuel Shenoy, Richardson, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 17/537,907

(22) Filed: Nov. 30, 2021

(65) Prior Publication Data

US 2023/0170794 A1 Jun. 1, 2023

(51) Int. Cl.
*H02M 3/06* (2006.01)
*H02M 1/00* (2006.01)

(52) U.S. Cl.
CPC .......... *H02M 3/06* (2013.01); *H02M 1/0003* (2021.05); *H02M 1/009* (2021.05); *H02M 1/0074* (2021.05); *H02M 1/0077* (2021.05)

(58) Field of Classification Search
CPC .... H02M 3/06; H02M 1/0074; H02M 1/0077; H02M 1/009; H02M 1/0003
See application file for complete search history.

(56) References Cited

U.S. PATENT DOCUMENTS

2016/0291621 A1* 10/2016 Whidden ................ G05F 1/577

\* cited by examiner

*Primary Examiner* — Jue Zhang
(74) *Attorney, Agent, or Firm* — Ray A. King; Frank D. Cimino

(57) ABSTRACT

In described examples, a power management circuit includes a voltage sensor and a differential power converter. The voltage sensor is coupled in series with other voltage sensors between a high voltage bus and a ground bus. The voltage sensor senses a voltage across an impedance and outputs a control signal in response to the sensed voltage. The differential power converter is coupled in series with other differential power converters and in parallel with a load between the high voltage bus and the ground bus. The differential power converter is configured to increase or decrease a supplied current in response to a change in magnitude of the control signal.

17 Claims, 5 Drawing Sheets

VOLTAGE REGULATOR FOR SERIES-CONNECTED LOADS

TECHNICAL FIELD

This application relates generally to power converters, and more particularly to differential power converters for series-connected loads.

BACKGROUND

Power converters can be used to adjust voltage and current characteristics of power delivered by a bus to multiple independent loads. For example, power converters can be used to ensure that each server in a rack of servers receives power with voltage and current complying with individual server requirements.

SUMMARY

In described examples, a power management circuit includes a voltage sensor and a differential power converter. The voltage sensor is coupled in series with other voltage sensors between a high voltage bus and a ground bus. The voltage sensor senses a voltage across an impedance and outputs a control signal in response to the sensed voltage. The differential power converter is coupled in series with other differential power converters and in parallel with a load between the high voltage bus and the ground bus. The differential power converter is configured to increase or decrease a supplied current in response to a change in magnitude of the control signal.

DETAILED DESCRIPTION

Figure 1:
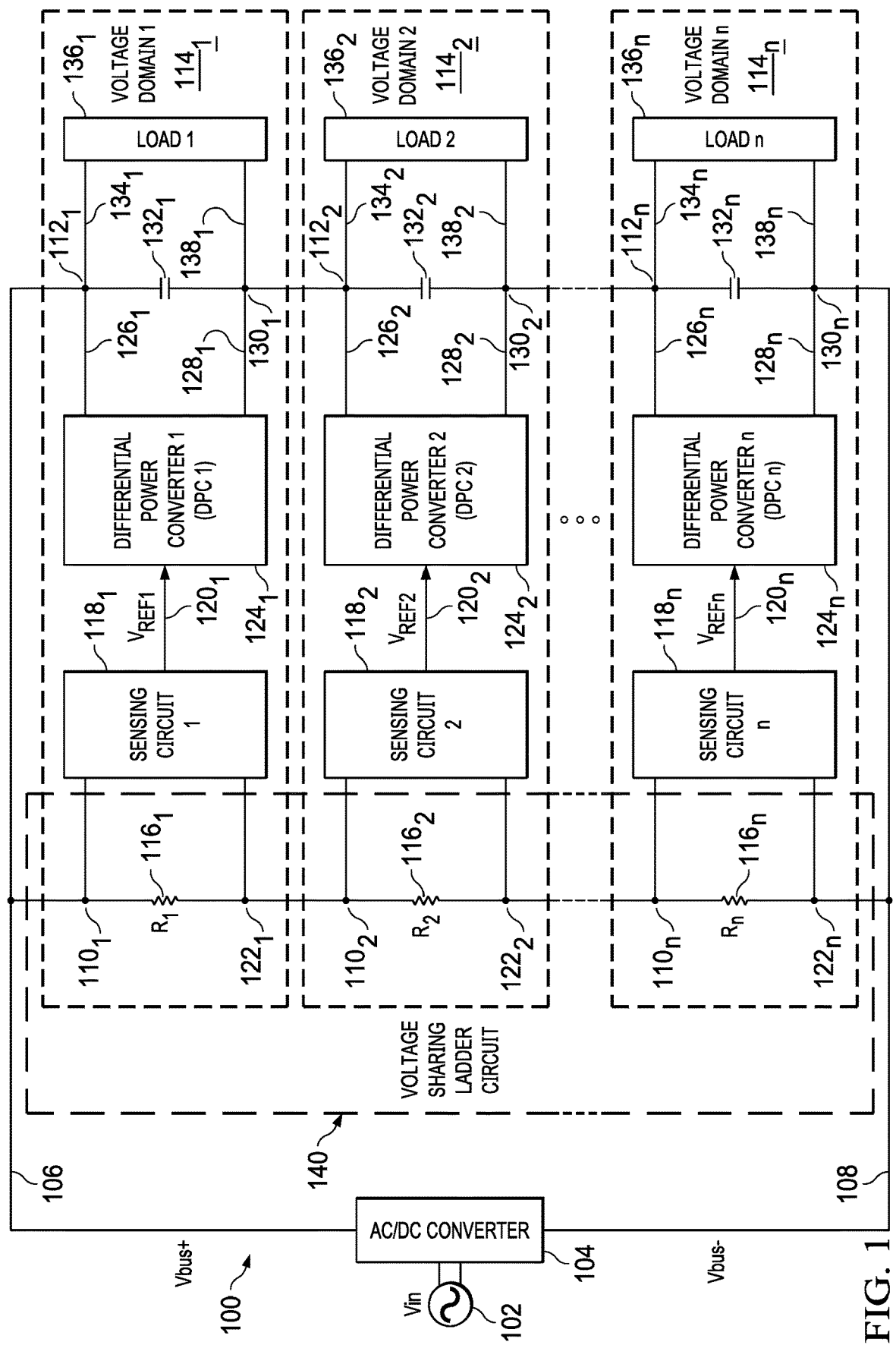
FIG. 1 shows an example circuit diagram of a voltage regulated system.

FIG. 1 shows an example circuit diagram of a voltage regulated system 100. High voltage and ground lines of an alternating current (AC) power input 102 are connected to an alternating current to direct current (AC/DC) converter 104. The AC power input 102 can be, for example, a power distribution grid. The AC/DC converter 104 outputs to a high voltage bus 106 with voltage Vbus$_+$ and is connected to a ground bus 108 with voltage Vbus$_-$. The high voltage bus 106 is connected to a first sense input terminal 1101 and a first power input terminal 112$_1$ of a first voltage domain (voltage domain 1) 114$_1$.

The first sense input terminal 110$_1$ is connected to a first terminal of a first sense resistor 116$_1$ with a first resistance R$_1$, and to a sensing circuit voltage input of a first sensing circuit (sensing circuit 1) 118$_1$. A second terminal of the first sense resistor 116$_1$ is connected at a first sense output terminal 122$_1$ to a sensing circuit ground input of first sensing circuit 118$_1$. The first sensing circuit 1 118$_1$ has a first sensing circuit output 120$_1$ that provides a voltage that is a first reference voltage, V$_{REF1}$.

A first differential power converter (differential power converter 1 or DPC 1) 124$_1$ has a control input connected to, and for receiving the first reference voltage VREF$_1$ from, the first sensing circuit output 120$_1$. DPC1 124$_1$ also has a first DPC voltage input 126$_1$ and a first DPC ground output 128$_1$. The first DPC voltage input 126$_1$ is connected to the first power input terminal 112$_1$. The first DPC ground output 128$_1$ is connected to a first power output terminal 130$_1$ of voltage domain 1 114$_1$. The first power output terminal 130$_1$ acts as a ground node (a low voltage reference) for voltage domain 1 114$_1$.

The first power input terminal 112$_1$ is connected to a first plate of a first transient compensating capacitor (capacitor 1) 132$_1$ and to a first load voltage input 134$_1$ of a first load (load 1) 136$_1$. A second plate of capacitor 1 132$_1$ is connected to the first power output terminal 130$_1$. (Capacitor 1 132$_1$ is configured to smooth voltage variations and compensate for line transients.) Load 1 136$_1$ also has a first load ground output 138$_1$, which is connected to the first power output terminal 130$_1$.

Voltage domain 1 114$_1$ includes the sense and power input and output terminals 110$_1$, 1121, 122$_1$,, and 1301, the first sense resistor 116$_1$, the sensing circuit 1 118$_1$ and the first sensing circuit output 120$_1$, DPC 1 124$_1$ and the first DPC voltage input and ground output 126$_1$ and 128$_1$, capacitor 1 132$_1$, load 1 136$_1$ and the first load voltage and ground inputs 134$_1$ and 138$_1$.

The first sense output terminal 122$_1$ is connected to a second sense input terminal 110$_2$ of a second voltage domain (voltage domain 2) 114$_2$. The first power output terminal 130$_1$ is connected to a second power input terminal 112$_2$ of the second voltage domain (voltage domain 2) 114$_2$. Voltage domain 2 114$_2$ includes similar components as voltage domain 1 114$_1$ that are similarly connected. Accordingly, these components and connections, and the V$_{REF}$ signal, are named and numbered as in voltage domain 1 114$_1$, except with a two (in normal text or subscript)—instead of a one—to indicate that they are part of voltage domain 2 114$_2$. Additional voltage domains with similar components connected similarly, numbered x up to a number n, are connected in series. These connections are made so that, for x>1, voltage domain x 114$_x$ is connected at respective sense and power input terminals 110$_x$ and 112$_x$ to sense and power output terminals 122$_{x-1}$ and 130$_{x-1}$ of voltage domain x−1; and, for x<n, at respective sense and power output terminals 122$_x$ and 130$_x$ to either sense and power input terminals 110$_{x+1}$ and 112$_{x+1}$ of voltage domain x+1 114$_{x+1}$, or for x=n, to the ground bus 108. These connections are similar to the connections between voltage domains 1 and 2, 114$_1$ and 114$_2$. The n$^{th}$ sense output terminal 122$_n$ of voltage domain n 114$_n$, and the n$^{th}$ power output terminal 130, of voltage domain n 114$_n$, are connected to the ground bus 108.

The sense resistors 116$_1$, 116$_2$, . . . , and 116$_n$ together form a voltage sharing ladder circuit 140. Accordingly, the voltage across each x$^{th}$ resistor is $$V_{Rx} = (Vbus_+ - Vbus_-) \times \frac{R_x}{R_1 + R_2 + \ldots + R_n}.$$

The resistances of the sense resistors 116$_1$, 116$_2$, . . . , and 116$_n$ are selected so that a small (or minimal) portion of the total current flowing from the high voltage bus 106 to the ground bus 108 passes through the voltage sharing ladder circuit 140, and a small (or minimal) portion of the total power used by the voltage domains $114_1$, $114_2$, ..., and $114_n$ is dissipated by the voltage sharing ladder circuit 140.

The DPCs $124_1$, $124_2$, ..., and $124_n$ are connected in series, the loads $136_1$, $136_2$, ..., and $136_n$ are connected in series, and the sense resistors $116_1$, $116_2$, ..., and $116_n$ are connected in series. Also, $x^{th}$ DPCs $124_1$, $124_2$, ..., and $124_n$ are connected in parallel to $x^{th}$ loads $136_1$, $136_2$, ..., and $136_n$; for example, DPC 2 $124_2$ is connected in parallel to load 2 $136_2$. Accordingly, the DPC $124_1$, $124_2$, ..., and $124_n$ and load $136_1$, $136_2$, ..., and $136_n$ pairs (DPC 1 $124_1$ and load 1 $136_1$, DPC 2 $124_2$ and load 2 $136_2$, etc.) are connected in series between the high voltage bus 106 and the ground bus 108. This means that the same current flows through each of the sense resistors $116_1$, $116_2$, ..., and $116_n$, and the same total current flows through each $x^{th}$ parallel DPC $124_x$ and load $136_x$ pair.

Voltage domain $114_x$ operation will be discussed with respect to voltage domain 1 $114_1$, which is used as a representative example. Sensing circuit 1 $118_1$ senses the voltage across the first sense resistor $116_1$, and generates a first reference voltage $V_{REF1}$ at the first sensing circuit output $120_1$. $V_{REF1}$ is used to indicate a target voltage, and controls DPC 1 $124_1$ to regulate the voltage between the first DPC voltage input $126_1$ and the first DPC ground output $128_1$ to $V_{REF1}$. DPC 1 $124_1$ uses a voltage across capacitor 1 $132_1$ as a feedback voltage. Accordingly, the voltage across capacitor 1 $132_1$ (which is equal to the voltage between the first load voltage input $134_1$ and the first load voltage output $138_1$) is regulated to $V_{REF1}$ (or a scaled version of $V_{REF1}$). This means that the voltage received by an $x^{th}$ load $136_x$ is regulated to a share of the voltage $Vbus_+ - Vbus_-$ between the high voltage bus 106 and the ground bus 108 that is determined by the resistance $R_x$ of the $x^{th}$ sense resistor $116_x$. In some embodiments, the resistances $R_1$, $R_2$, ..., and $R_n$ of the sense resistors $116_1$, $116_2$, ..., and $116_n$ are the same. In some embodiments, one or more (or all) of the resistances $R_1$, $R_2$, ..., and $R_n$ of the sense resistors $116_1$, $116_2$, ..., and $116_n$, are different.

The voltage sharing ladder circuit 140 with its component sense resistors $116_1$, $116_2$, ..., and $116_n$, along with the sensing circuits $118_1$, $118_2$, ..., and $118_n$, enable control of individual DPCs $124_1$, $124_2$, ..., and $124_n$ that is local with respect to corresponding voltage domains $114_1$, $114_2$, ..., and $114_n$. Accordingly, the resistances $R_1$, $R_2$, ..., and $R_n$ of the sense resistors $116_1$, $116_2$, ..., and $116_n$ can be specified so that there is a selected share of the total voltage $Vbus_+ - Vbus_-$ (the voltage between the high voltage bus 106 and the ground bus 108) across each of the sense resistors $116_1$, $116_2$, ..., and $116_n$.

To regulate voltage, each of the DPCs $124_1$, $124_2$, ..., and $124_n$ supplies more or less current from the respective power input terminal $112_1$, $112_2$, ..., or $112_n$ in response to a respective reference voltage $V_{REF1}$, $V_{REF2}$, ..., or $V_{REFn}$—accordingly, in response to a voltage across the respective sense resistor $116_1$, $116_2$, ..., or $116_n$—and in response to a feedback voltage across the respective transient compensating capacitor $132_1$, $132_2$, ..., or $132_n$. A DPC $124_1$, $124_2$, ..., or $124_n$ supplying less current means that less current will be directed to the respective parallel-connected load $136_1$, $136_2$, ..., or $136_n$ (with respect to the current available at the corresponding power input terminal $112_1$, $112_2$, ..., or $112_n$, which fluctuates with line conditions), decreasing the feedback voltage across the respective transient compensating capacitor $132_1$, $132_2$, ..., or $132_n$.

This decreases the voltage across the respective load $136_1$, $136_2$, ..., or $136_n$. Similarly, a DPC $124_1$, $124_2$, ..., or $124_n$ supplying more current means that more current will be directed to the respective load $136_1$, $136_2$, ..., or $136_n$, increasing the feedback voltage across the respective transient compensating capacitor $132_1$, $132_2$, ..., or $132_n$. This increases the voltage across the respective load $136_1$, $136_2$, ..., or $136_n$. Accordingly, by adjusting their current draw, a DPC $124_1$, $124_2$, ..., or $124_n$ regulates the voltage across its respective load $136_1$, $136_2$, ..., or $136_n$. During normal operation, DPCs $124_1$, $124_2$, ..., and $124_n$ sink sufficient current from the respective power input terminal $112_1$, $112_2$, ..., or $112_n$ to provide the DPCs $124_1$, $124_2$, ..., and $124_n$ flexibility to react (by supplying or sinking more current) to a designed tolerable level of variation in bus 106 and 108 conditions (such as voltage variation), addition or removal of loads $136_1$, $136_2$, ..., or $136_n$ to or from the voltage regulated system 100 (for example, during a hotswap event, as further discussed with respect to FIG. 3), and other changes in voltage conditions. (Sinking current is equivalent to supplying negative current.)

In some examples, in a steady state operating condition, a DPC $124_1$, $124_2$, ..., or $124_n$ will respond to fluctuations in line current and attendant fluctuations in voltage across a corresponding transient compensating capacitor $132_1$, $132_2$, ..., or $132_n$ by making adjustments in supplied current. These adjustments in supplied current will be made to return the voltage across the transient compensating capacitor $132_1$, $132_2$, ..., or $132_n$ (and therefore, across the load $136_1$, $136_2$, ..., or $136_n$) to the target level determined by the voltage across the sense resistor $116_1$, $116_2$, ..., or $116_n$. This can also be viewed as the DPC $124_1$, $124_2$, ..., or $124_n$ adding charge to or removing charge from the transient compensating capacitor $132_1$, $132_2$, ..., or $132_n$ to compensate for undercharge or overcharge on the transient compensating capacitor $132_1$, $132_2$, ..., or $132_n$ caused by decreases or increases in line current.

In some examples, in response to a transient event, such as a relatively fast and relatively large rise in the current demanded by the load $136_1$, $136_2$, ..., or $136_n$, the transient compensating capacitor $132_1$, $132_2$, ..., or $132_n$ will expend stored energy to meet the increased demand (and will continue to do so as current supplied by the DPC $124_1$, $124_2$, ..., or $124_n$ rises to meet the demand, due to finite response time of the DPC $124_1$, $124_2$, ..., or $124_n$. This causes the voltage across the transient compensating capacitor $132_1$, $132_2$, ..., or $132_n$ to drop. In response, the DPC $124_1$, $124_2$, ..., or $124_n$ supplies additional current to bring the feedback voltage across the transient compensating capacitor $132_1$, $132_2$, ..., or $132_n$ back to the target level determined by the voltage across the sense resistor $116_1$, $116_2$, ..., or $116_n$. This can also be viewed as the DPC $124_1$, $124_2$, ..., or $124_n$ raising its supplied current to meet the increased demand from the load $136_1$, $136_2$, ..., or $136_n$, and supplying additional current to recharge the transient compensating capacitor $132_1$, $132_2$, ..., or $132_n$.

In some examples, by using a voltage across a sense resistor $116_1$, $116_2$, ..., or $116_n$ of a voltage sharing ladder circuit 140 to indicate a target voltage to be regulated across a corresponding load $136_1$, $136_2$, ..., or $136_n$, a DPC $124_1$, $124_2$, ..., or $124_n$ can regulate the corresponding load $136_1$, $136_2$, ..., or $136_n$ to the target voltage without external control. A target voltage corresponds to a selected fraction of the voltage between the high voltage bus 106 and the ground bus 108 to be regulated across the corresponding load $136_1$, $136_2$, ..., and $136_n$. The fraction of total available voltage to be regulated across a load $136_1$, $136_2$, ..., and $136_n$ is selected by the fraction of the total resistance of the voltage sharing ladder circuit 140 represented by a corresponding sense resistor $116_1$, $116_2$, ..., or $116_n$.

Figure 2:
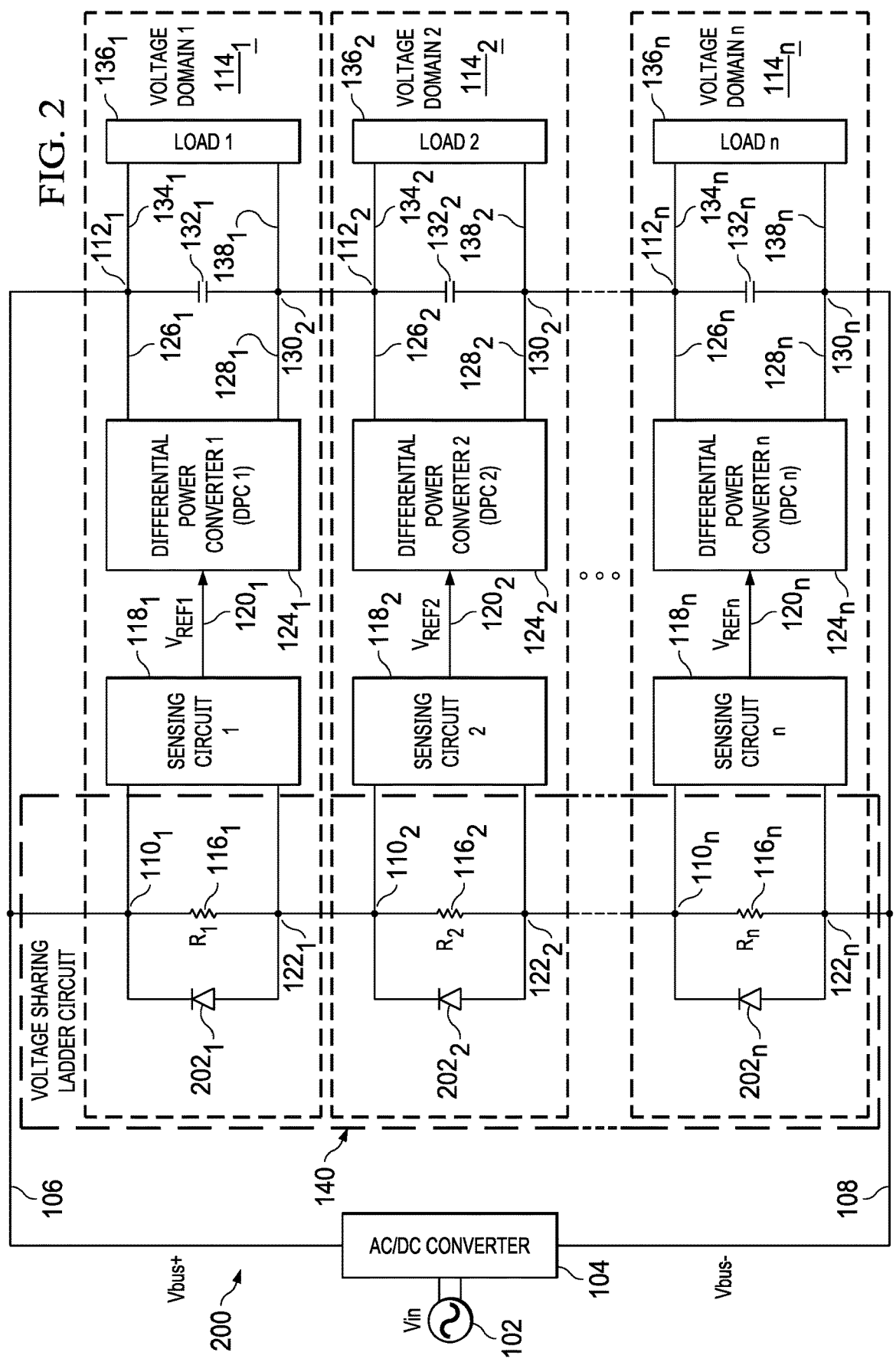
FIG. 2 shows an example circuit diagram of a voltage regulated system.

FIG. 2 shows an example circuit diagram of a voltage regulated system 200. Some components, connections, and signals in FIG. 2 and later figures are similar to those in FIG. 1, and are given the same item numbering. In each of the voltage domains $114_1$, $114_2$, ..., and $114_n$, an anode (input terminal) of a corresponding Zener diode $202_1$, $202_2$, ..., or $2020_n$ is connected to the sense input terminal $122_1$, $122_2$, ..., or $122_n$ of the voltage domain $114_1$, $114_2$, ..., or $114_n$; and a cathode (output terminal) of the corresponding Zener diode $202_1$, $202_2$, ..., or $202_n$ is connected to the sense input terminal $1101$, $1102$, ..., or $110_n$ of the voltage domain $114_1$, $114_2$, ..., or $114_n$.

The Zener diodes $202_1$, $202_2$, ..., and $202_n$ are used as voltage clamps to prevent the voltage across respective ones of the sense resistors $116_1$, $116_2$, ..., or $116_n$ from rising above a designed maximum voltage across the resistor, resulting in a reference voltage $V_{REFX}$ that controls DPC x $124_x$ to cause the voltage across load x $136_x$ to rise above a designed maximum.

Rapid or transient changes in voltage across individual ones of the sense resistors $116_1$, $116_2$, ..., or $116_n$ can be caused by, for example, line conditions on the high voltage bus 106 or the ground bus 108, or by removal of a load $136_1$, $136_2$, ..., and $136_n$ from a corresponding voltage domain $114_1$, $114_2$, ..., and $114_n$. In some examples, such as in a server rack, a load $136_1$, $136_2$, ..., and $136_n$—a server—is removed to perform a hotswap, in which a server is removed from the server rack without de-powering the server rack (while the other servers in the server rack are still running). Rapid or transient changes in voltage can cause an overvoltage condition, in which voltage between the high voltage bus 106 and the ground bus 108 rises to a level at which DPCs $124_1$, $124_2$, ..., or $124_n$ become too slow or unable to regulate voltage across corresponding loads $136_1$, $136_2$, ..., and $136_n$ to within designed limits. In some example overvoltage conditions, voltage regulation systems of different voltage domains $114_1$, $114_2$, ..., and $114_n$ can start to fight each other to separately—and futilely—attempt to lower voltage across respective transient compensating capacitors $132_1$, $132_2$, ..., and $132_n$.

In some examples, if an overvoltage condition is detected on all or more than a threshold number of sense resistors, $116_1$, $116_2$, ..., and $116_n$, a fault condition is triggered and a protection measure is applied. For example, the AC/DC converter 104 can be turned off until a detected voltage between the high voltage bus 106 and the ground bus 108 returns to a nominal value. Alternatively, a shunt or voltage sink (not shown) can be connected between the high voltage bus 106 and the ground bus 108 to selectively reduce a voltage to be regulated by the voltage domains $114_1$, $114_2$, ..., or $114_n$.

Figure 3:
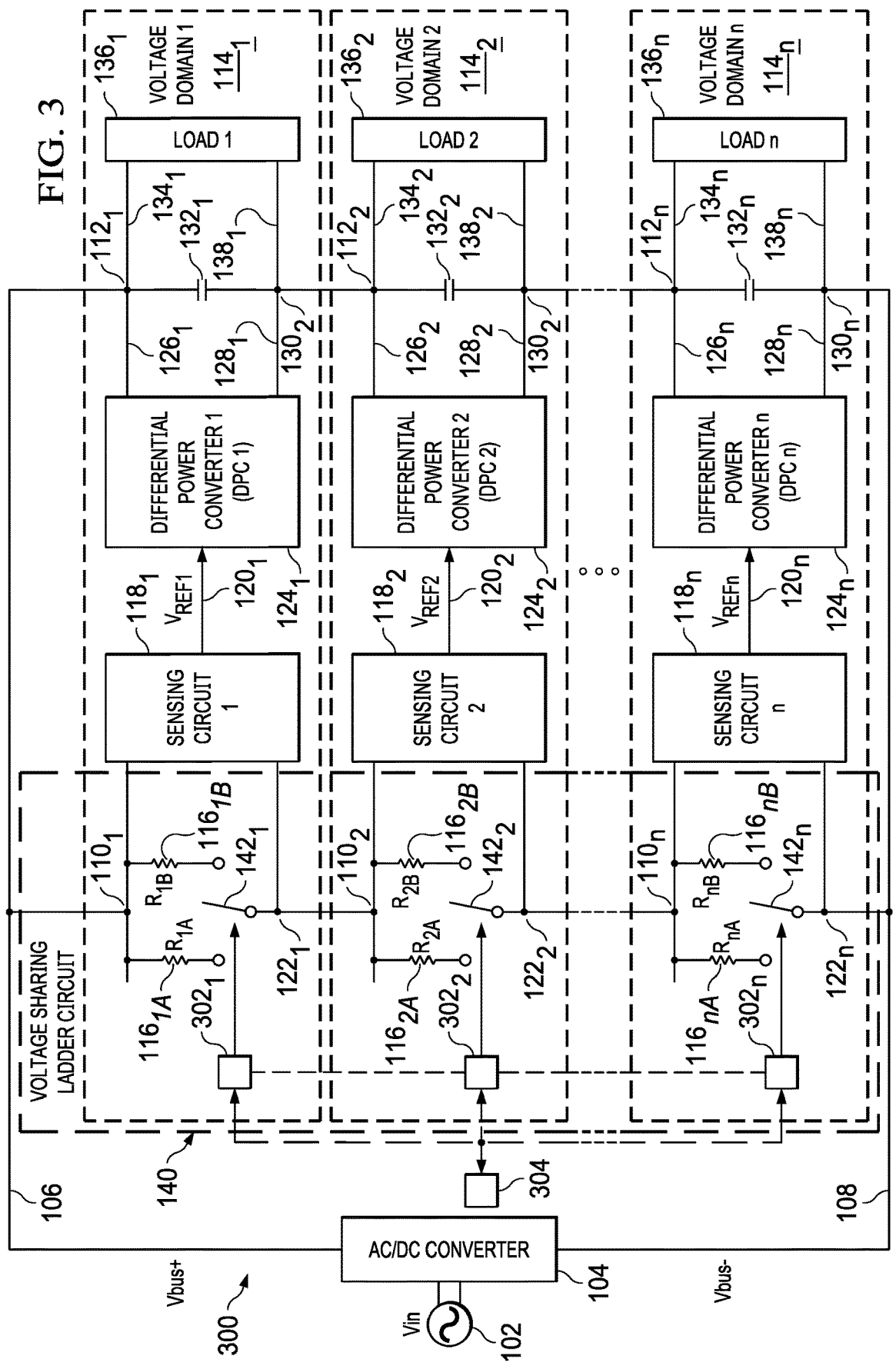
FIG. 3 shows an example circuit diagram of a voltage regulated system.

FIG. 3 shows an example circuit diagram of a voltage regulated system 300. In each of the voltage domains $114_1$, $114_2$, ..., and $114_n$, a first terminal of an A sense resistor $116_{1A}$, $116_{2A}$, ..., $116_{nA}$ with resistance $R_{1A}$, $R_{2A}$, $R_{nA}$ and a first terminal of a B sense resistor $1161_B$, $116_{2B}$, ..., $116_{nB}$ with resistance $R_{1B}$, $R_{2B}$, RnB are connected to the sense input terminal $110_1$, $110_2$, ..., $110_n$. A second terminal of the A sense resistor $116_{1A}$, $116_{2A}$, ..., $116_{nA}$ is selectively connected to a first throw terminal of a switch $142_1$, $142_2$, ..., and $142_n$, and a second terminal of the B sense resistor $116_{1B}$, $116_{2B}$, ..., $116_{nB}$ is selectively connected to a second throw terminal of the switch $142_1$, $142_2$, ..., and $142_n$. A pole of the switch $142_1$, $142_2$, ..., and $142_n$ is connected to the sense output terminal $122_1$, $122_2$, ..., and $122_n$. Connecting A and B sense resistors $116_{1A}$, $116_{2A}$, ..., $116_{nA}$, and $116_{1B}$, $116_{2B}$, ..., $116_{nB}$ to be selected by a switch $142_1$, $142_2$, ..., and $142_n$ enables options to address different line conditions or hotswap preferences, and to enable voltage regulation of voltage domains $114_1$, $114_2$, ..., and $114_n$ in a voltage regulated system 300 with various configurable numbers of loads $136_1$, $136_2$, ..., and $136_n$ or various possible load operating voltages of different types of loads $136_1$, $136_2$, ..., and $136_n$. Switches $142_1$, $142_2$, ..., and $142_n$ can be electrically or mechanically implemented and actuated.

In some examples, switches are controlled from within a voltage domain by an internal switch controller $302_1$, $302_2$, ..., and $302_n$. In some examples, internal switch controllers $302_1$, $302_2$, ..., and $302_n$ are connected to communicate with each other to enable switch control responsive to conditions across the voltage regulated system 300. In some examples, internal switch controllers $302_1$, $302_2$, ..., and $302_n$ are connected to communicate with, and to be controlled by or fed data enabling internal control by, an external controller 304. (Dotted lines show example alternatives for communication and control.) In some examples, a switch array including more than two switches (not shown) is used to enable a wider variety of potential configurations; for example, to enable multiple hotswap or fault tolerance configurations.

Figure 4:
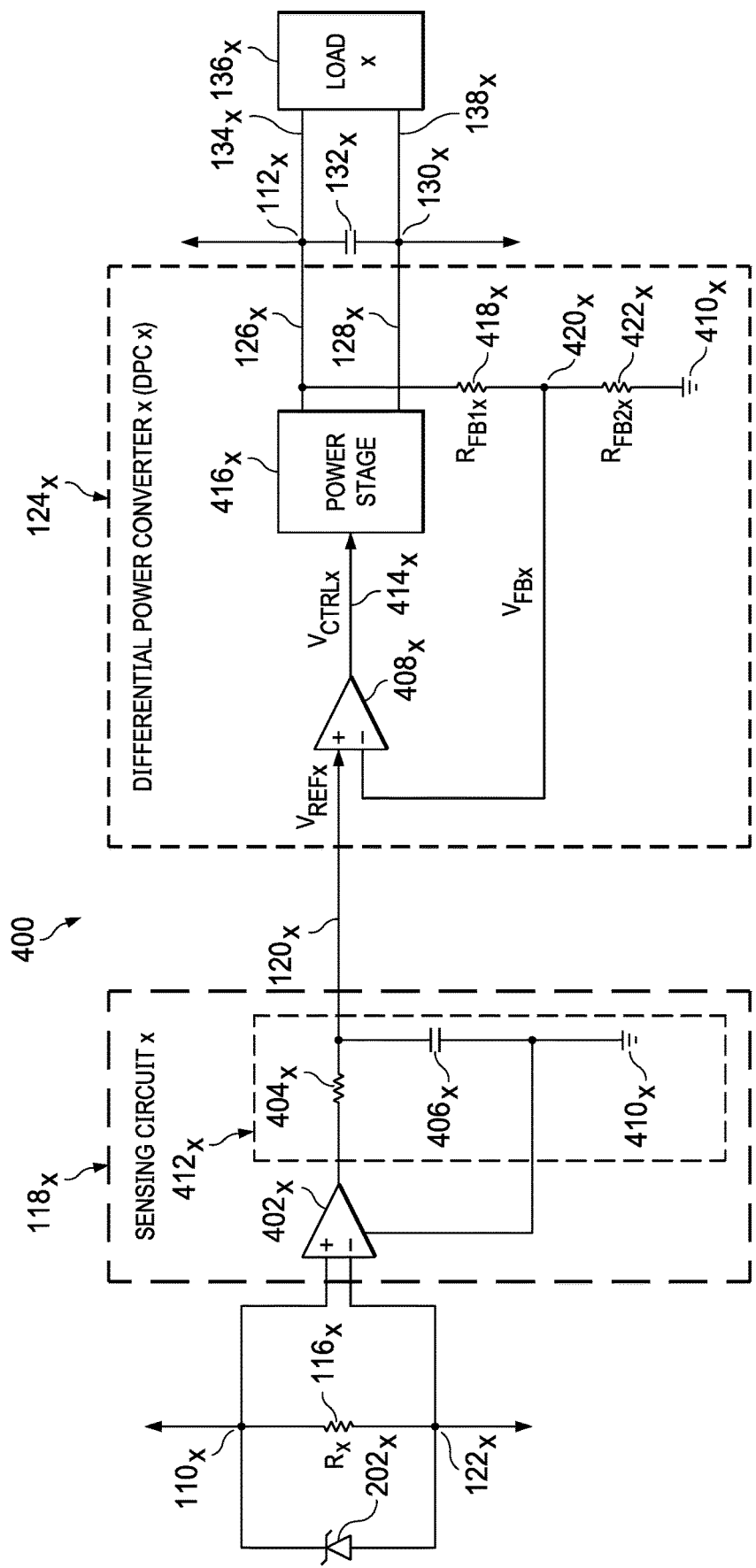
FIG. 4 shows an example circuit diagram of an $x^{th}$ voltage regulated voltage domain as shown in FIG. 2.

FIG. 4 shows an example circuit diagram 400 of an $x^{th}$ voltage regulated voltage domain $114_x$ as shown in FIG. 2. A sensing differential amplifier $402_x$ has a non-inverting input (a positive input) and an inverting input (a negative input). The non-inverting input of the sensing differential amplifier $402_x$ is connected via the high voltage input of sensing circuit x $118_x$ to the sense input terminal $110_x$. The inverting input of the sensing differential amplifier $402_x$ is connected via the ground input of sensing circuit x $118_x$ to the sense output terminal $122_x$. An output of the sensing differential amplifier $402_x$ is connected to a first terminal of a filter resistor $404_x$. A second terminal of the filter resistor $404_x$ is connected to a first plate of a filter capacitor $406_x$ and a non-inverting input of a DPC differential amplifier $408_x$. A ground input of the sensing differential amplifier $402_x$ is connected to a second plate of the filter capacitor $406_x$ and to a ground $410_x$ of the voltage domain $114_x$. (As described above, in some examples, the voltage domain $114_x$ uses the power output terminal $130_x$ as a ground or low voltage reference.) The filter resistor $404_x$ and the filter capacitor $406_x$ together comprise a low pass filter $412_x$.

The low pass filter $412_x$ outputs the voltage reference $V_{REFX}$ to differential power converter x $124_x$ via the output $120_x$ of sensing circuit x $118_x$. The sensing differential amplifier $402_x$ and the low pass filter $412_x$ together comprise sensing circuit x $118_x$. The output of the low pass filter $412_x$ (which is connected to the non-inverting input of the DPC differential amplifier $408_x$) is the output of sensing circuit x $120_x$.

An output $414_x$ of the DPC differential amplifier $408_x$ is connected to control a DPC power stage $416_x$. The DPC power stage $416_x$ has a voltage input that is the DPC voltage input $126_x$ and a ground output that is the DPC ground output $128_x$. The DPC voltage input $126_x$ is connected to a first terminal of a first DPC resistor $418_x$. A second terminal of the first DPC resistor $418_x$ is connected to a DPC node $420_x$. The first DPC resistor $418_x$ has resistance $R_{FB1x}$. The DPC node $420_x$ is connected to a first terminal of a second DPC resistor $422_x$, and to an inverting input of the DPC differential amplifier $408_x$. The second DPC resistor $422_x$ has resistance $R_{FB2x}$. The voltage at the DPC node $420_x$ is a feedback voltage $V_{FBx}$ of DPC x $124_x$. The first and second DPC resistors $418_x$ and $422_x$ form a resistor divider, so that $V_{FBx}=V_{cx}\times R_{FB2x}/(R_{FB1x}+R_{FB2x})$, wherein $V_{cx}$ is the voltage across the $x^{th}$ transient compensation capacitor $132_x$.

The power converter differential amplifier $408_x$ is an error amplifier responsive to $V_{REFX}$ and to $V_{FBX}$. $V_{REFx}$ sets the target voltage for the power stage $416_x$ (for example, $V_{REFX}$). $V_{FBx}$ is representative of the voltage across capacitor x $132_x$, for comparison to determine if that capacitor voltage equals the target voltage. The control voltage output by the power converter differential amplifier $414_x$, $V_{CTRLx}$, controls the power stage $416_x$ to siphon less current (add current to) or siphon additional current from the power input terminal $112_x$ to make the voltage across capacitor x $132_x$ $V_{cx}$ (represented by $V_{FBX}$) equal to the target voltage $V_{TARGETX}$ (represented by $V_{REFx}$). In some examples, $V_{REFx}=V_{TARGETx}\times R_{FB2x}/(R_{FB1x}+R_{FB2x})$.

Figure 5:
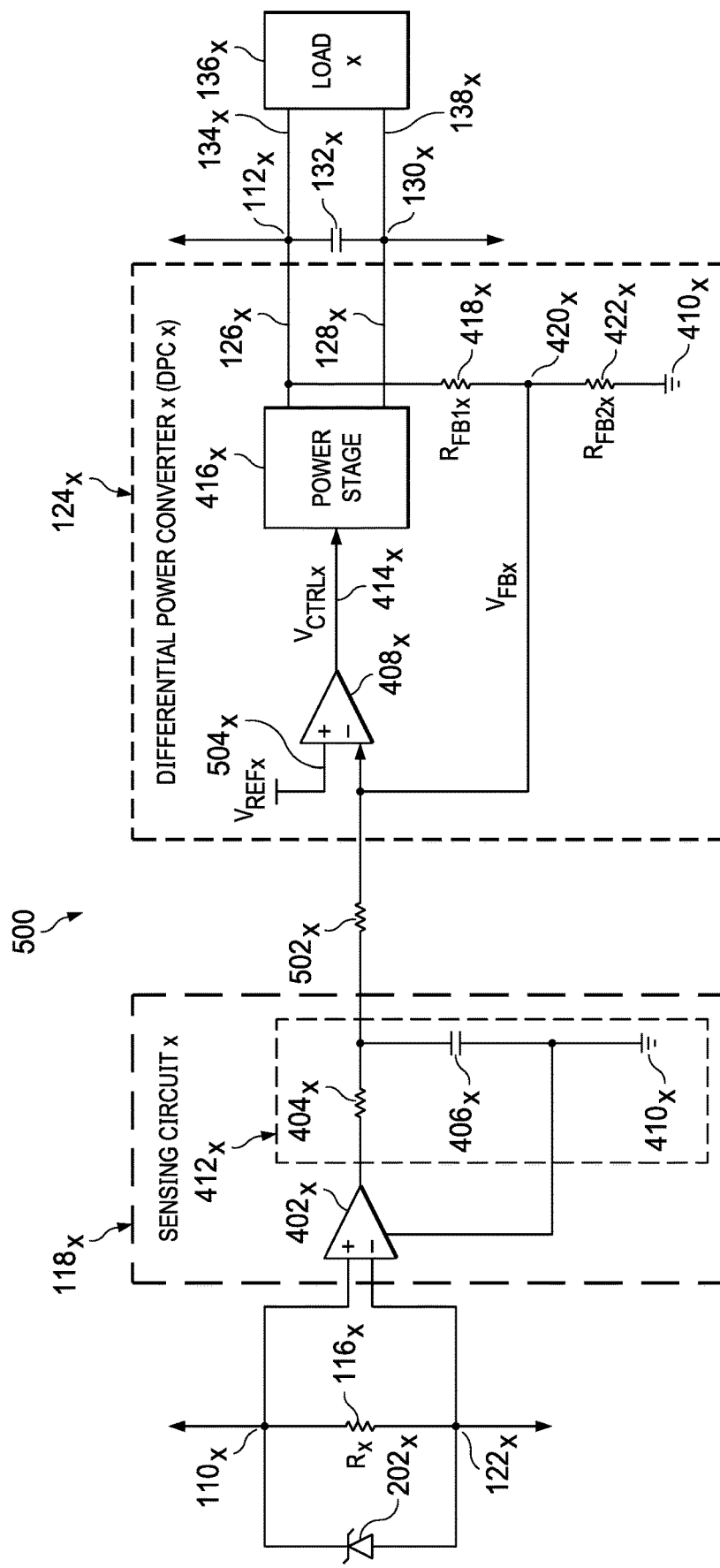
FIG. 5 shows another example circuit diagram of an $x^{th}$ voltage regulated voltage domain as shown in FIG. 2.

FIG. 5 shows another example circuit diagram 500 of an $x^{th}$ voltage regulated voltage domain $114_x$ as shown in FIG. 2. The output of the low pass filter $412_x$ is connected to a first terminal of a feedback resistor $502_x$. A second terminal of the feedback resistor $502_x$ is connected to the inverting input of the DPC differential amplifier resistor $408_x$ and to the DPC node $420_x$. A constant reference voltage $V_{REFX}$ $504_x$ (which can be generated as, for example, a bandgap voltage reference) is connected to the non-inverting input of the DPC differential amplifier $408_x$. Because $V_{FBx}$ is a feedback voltage controlled by the output of the power converter differential amplifier $408_x$ $V_{CTRLx}$, $V_{FBx}$ equals $V_{REFX}$.

The output voltage of sensing circuit x $118_x$ interacts with the feedback voltage $V_{FBX}$ to effect control of DPC x $124_x$. If the output voltage of sensing circuit x $118_x$ is greater than $V_{REFX}$, feedback resistor $502_x$ acts like it is parallel with the first DPC resistor $418_x$; current travels through feedback resistor $502_x$ from DPC x $124_x$ towards sensing circuit x $118_x$; and $V_{CTRLx}$ is output to cause the power stage $416_x$ to control the voltage across capacitor x $132_x$ to decrease. If the output voltage of sensing circuit x $118_x$ is less than $V_{REFX}$, feedback resistor $502_x$ acts like it is parallel with the second DPC resistor $422_x$; current travels through feedback resistor $502_x$ from sensing circuit x $118_x$ towards DPC x $124_x$; and $V_{CTRLX}$ is output to cause the power stage $416_x$ to control the voltage across capacitor x $132_x$ to increase.

Modifications are possible in the described embodiments, and other embodiments are possible, within the scope of the claims.

In some examples, the first sense output terminal $122_1$, can also act as a ground node for parts or all of a voltage domain 1 $114_1$, $114_2$, . . . , and $114_n$.

In some examples, $V_{REF}$ is an isolated communications channel.

In some examples, clamp voltages are selected to be heterogeneous—accordingly, different clamp voltages are selected for different ones of the voltage clamps (such as Zener diodes $202_1$, $202_2$, . . . , or $202_n$).

In some examples, voltage clamps other than Zener diodes, such as voltage clamps that more accurately clamp voltage, are used.

In some examples, a reference voltage $V_{REFX}$ and a target voltage are related by a scalar value.

In some examples, a hotswap action in a voltage domain $114_1$, $114_2$, . . . , or $114_n$, (for example, a server being removed from a server rack without the server rack being de-powered) triggers a hotswap switch (not shown) that facilitates the other voltage domains $114_1$, $114_2$, . . . , and $114_n$ compensating for resulting increased voltage. For example, different voltage domains $114_1$, $114_2$, . . . , and $114_n$ can adjust their sense resistor $116_1$, $116_2$, . . . , and $116_n$ resistances $R_1$, $R_2$, . . . , and Rn differently to address different designed operating voltage ranges of different ones of the loads $136_1$, $136_2$, . . . , and $136_n$.

In some examples, DPCs $124_1$, $124_2$, . . . , and $124_n$ share current on a virtual bus (not shown) and add current to or sink additional current from the virtual bus in response to changes in the control voltage $V_{CTRL}$.

In some examples, different sense resistor $116_1$, $116_2$, . . . , and $116_n$ resistances $R_1$, $R_2$, . . . , and $R_n$ can be different. In some examples, a sense resistor $116_1$, $116_2$, . . . , and $116_n$ respective resistance $R_1$, $R_2$, . . . , and $R_n$ can be configured to specify a target voltage from near zero to near the full voltage difference between the high voltage bus 106 and the ground bus 108.

In some examples, a DPC $124_1$, $124_2$, . . . , and $124_n$ adjusts current draw in proportion to a change in a corresponding control voltage output by a sensing circuit 1181, 1182, . . . , and $118_n$.

In some examples, a DPC $124_1$, $124_2$, . . . , and $124_n$ adjusts current draw in inverse proportion to a change in a corresponding control voltage output by a sensing circuit $118_1$, $118_2$, . . . , and $118_n$.

In some examples, sensing circuits $118_1$, $118_2$, . . . , and $118_n$ uses pulse width modulation, pulse frequency modulation, or another digital or analog control scheme to control the target voltage to which corresponding DPCs $124_1$, $124_2$, . . . , and $124_n$ regulate the voltage across corresponding transient compensating capacitors $132_1$, $132_2$, . . . , and $132_n$.

In some examples, different portions of a voltage domain $114_1$, $114_2$, . . . , or $114_n$ can be provided separately. For example, a load $136_1$, $136_2$, . . . , or $136_n$ can be provided separately from a sense resistor $116_1$, $116_2$, . . . , or $116_n$, sensing circuit $118_1$, $118_2$, . . . , or $118_n$, and DPC $124_1$, $124_2$, . . . , and $124_n$. Accordingly, DPCs $124_1$, $124_2$, . . . , and $124_n$ being referred to as being adapted to be coupled in series between the high voltage bus 106 and the ground bus 108 includes individual DPCs $124_1$, $124_2$, . . . , and $124_n$ being adapted to be coupled in parallel with corresponding loads $136_1$, $136_2$, . . . , or $136_n$. This means that individual DPCs $124_1$, $124_2$, . . . , or $124_n$ are adapted to be coupled to corresponding loads $136_1$, $136_2$, . . . , or $136_n$ to form DPC-load pairs $124_1$ and $136_1$, $124_2$, and $136_2$, . . . , and $124_n$ and $136_n$ that are coupled in series between the high voltage bus 106 and the ground bus 108 with other parallel-coupled DPC-load pairs $124_1$ and $136_1$, $124_2$, and $136_2$, . . . , and $124_n$ and $136_n$.

What is claimed is:

1. A power management circuit, comprising:
 a resistor having first and second resistor terminals, wherein the first resistor terminal is coupled to either a high voltage bus or to a resistor from a first separate power management circuit, and the second resistor terminal is coupled to either a ground bus or to a resistor from a second separate power management circuit, so that no more than one of the first resistor terminal or the second resistor terminal is coupled to the high voltage bus or the ground bus;
 a sensing circuit having a sense input, a sense ground, and a sense output, wherein the sense input is coupled to the first resistor terminal, the sense ground is coupled to the second resistor terminal, and the sensing circuit is configured to provide a sense signal in response to a voltage across the resistor;
 a load input terminal coupled to a voltage input of a load, and a load output terminal coupled to a voltage output of the load;

a power input terminal coupled to either a high voltage bus or to a power output terminal of another power management circuit;

a power output terminal coupled to either a ground bus or to a power input terminal of another power management circuit, wherein no more than one of the power input terminal or the power output terminal is coupled to the high voltage bus or the ground bus;

a differential power converter having a control input, a converter input, and a converter output, wherein the control input is coupled to the sense output, the converter input is coupled to the load input terminal and the power input terminal, the converter output is coupled to the load output terminal and the power output terminal, and the differential power converter is configured to increase or decrease a current supplied by the differential power converter in response to a change in magnitude of the sense signal; and a voltage clamp having first and second clamp terminals, wherein the first clamp terminal is coupled to the first resistor terminal, the second clamp terminal is coupled to the second resistor terminal, and a voltage between the first clamp terminal and the second clamp terminal is limited to a clamping voltage of the voltage clamp.

2. The power management circuit of claim 1, wherein the power input terminal and the power output terminal are coupled the differential power converter and the load in parallel.

3. The power management circuit of claim 2,
wherein the differential power converter is a first differential power converter, and the load is a first load; and
wherein the power input terminal and the power output terminal are coupled the first differential power converter and the first load in series with a parallel-connected second differential power converter and a second load.

4. The power management circuit of claim 1 wherein the voltage clamp is a Zener diode.

5. The power management circuit of claim 1,
wherein the resistor is a first resistor, and the power management circuit further comprises:
a circuit input terminal and a circuit output terminal;
a second resistor having third and fourth resistor terminals, wherein the third resistor terminal is coupled to either the high voltage bus or to the second resistor terminal of another power management circuit, and the fourth resistor terminal is coupled to either the ground bus or to the first resistor input terminal of another power management circuit; and
a switch having first and second switch terminals, wherein the switch is coupled between either:
the first or the third resistor terminal and the circuit input terminal; or
the second or the fourth resistor terminal and the circuit output terminal.

6. The power management circuit of claim 1,
further including a capacitor having a first plate and a second plate, wherein the first plate is coupled to the power input terminal, the converter input, and the load input terminal, and the second plate is coupled to the power output terminal, the converter output, and the load output terminal;
wherein the differential power converter is configured to adjust the current supplied by the differential power converter so that a voltage across the capacitor equals a target voltage determined by the sense signal.

7. A power management system, comprising:
multiple resistors coupled in a first series, wherein a first resistor of the first series is coupled to a high voltage bus, and a last resistor of the first series is coupled to a ground bus;
multiple sensing circuits, wherein each of the sensing circuits is configured to sense a sensed voltage across a respective resistor of the multiple resistors, and each of the sensing circuits is configured to provide a control signal in response to the sensed voltage;
multiple pairs of load input and load output terminals, pairs of the load input and load output terminals coupled to a voltage input and a voltage output, respectively, of a corresponding load;
multiple differential power converters coupled in a second series, wherein a first differential power converter of the second series is coupled to a high voltage bus, and a last differential power converter of the second series is coupled to a ground bus, each of the differential power converters configured coupled to receive a respective control signal, each of the differential power converters having a converter input and a converter output, wherein the converter input and the converter output are respectively coupled to a respective pair of load input terminals and load output terminals, and each of the differential power converters is configured to increase or decrease a current supplied by the differential power converter in response to a change in magnitude of the control signal; and
multiple voltage clamps, wherein each of the voltage clamps is coupled in parallel with a corresponding resistor of the multiple resistors so that a voltage from a high voltage bus terminal of the voltage clamp to a ground bus terminal of the voltage clamp is limited by a clamping voltage of the voltage clamp.

8. The power management system of claim 7, wherein each of the differential power converters are coupled between the high voltage bus and the ground bus in parallel with the corresponding load.

9. The power management system of claim 7, wherein the voltage clamps are Zener diodes.

10. The power management system of claim 7, wherein the multiple resistors are multiple first resistors and the power management system further includes:
multiple second resistors, wherein each resistor of the multiple second resistors are coupled in parallel with a corresponding resistor of the first multiple resistors; and
multiple switches, wherein each of the switches is configured to select between a corresponding one of the first switches and a corresponding one of the second switches, so that the selected one of the first switch or the second switch is included in a circuit connecting the high voltage bus to the ground bus, and the non-selected one of the first switch or second switch is open circuit.

11. The power management system of claim 7,
further including multiple capacitors, wherein each ones of the capacitors is coupled between the converter input and the converter output of a corresponding respective differential power converter;
wherein each respective differential power converter is configured to adjust the current supplied by the respective differential power converter so that a voltage across the respective capacitor equals a target voltage determined by the control signal.

12. A power management circuit, comprising:
- a voltage sensor coupled in series with other voltage sensors between a high voltage bus and a ground bus, wherein the voltage sensor is configured to sense a sensed voltage across an impedance of the voltage sensor and to provide a control signal in response to the sensed voltage;
- a differential power converter coupled in series with other differential power converters and in parallel with a load between the high voltage bus and the ground bus, wherein the differential power converter is configured to increase or decrease a current supplied by the differential power converter in response to a change in magnitude of the control signal; and
- a voltage clamp configured to clamp a voltage of the voltage sensor.

13. The power management circuit of claim 12, wherein the differential power converter is coupled in series with other differential power converters and other loads between the high voltage bus and the ground bus, wherein the other differential power converters are coupled in parallel with corresponding ones of the other loads between the high voltage bus and the ground bus.

14. The power management circuit of claim 12, wherein the voltage clamp is a Zener diode.

15. The power management circuit of claim 12,
- wherein the voltage sensor includes a first resistor, a second resistor, and a switch;
- wherein the switch is configured to select the first switch and the second switch, so that the selected one of the first switch or the second switch is included in a circuit connecting the high voltage bus to the ground bus, and the non-selected one of the first switch or second switch is open circuit, and the sensed voltage is a voltage across the selected one of the first switch and the second switch.

16. The power management circuit of claim 12,
- further comprising a capacitor coupled between a converter input and a converter output of the differential power converter;
- wherein the differential power converter is configured to adjust the current supplied by the converter input so that a voltage across the capacitor equals a target voltage determined by the control signal.

17. The power management circuit of claim 16, wherein the differential power converter includes a first control input and a second control input, the first control input is configured to receive the control signal from the voltage sensor, and the second control input is configured to receive a feedback signal responsive to the voltage across the capacitor.

* * * * *